UNITED STATES PATENT OFFICE.

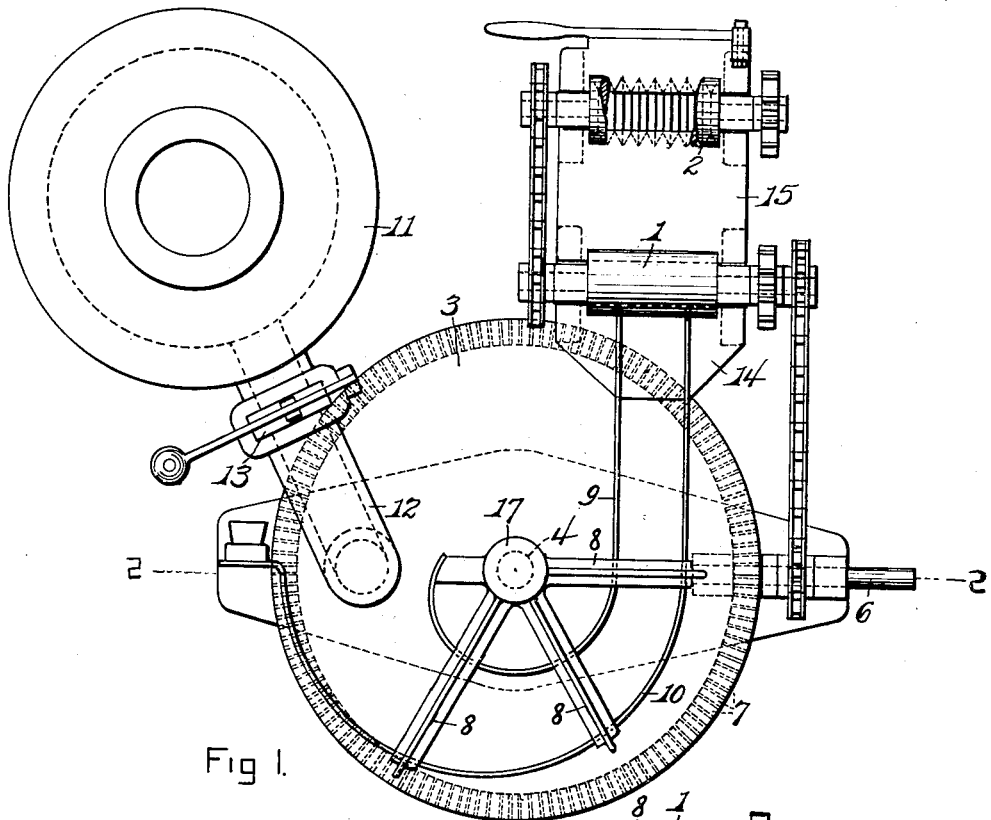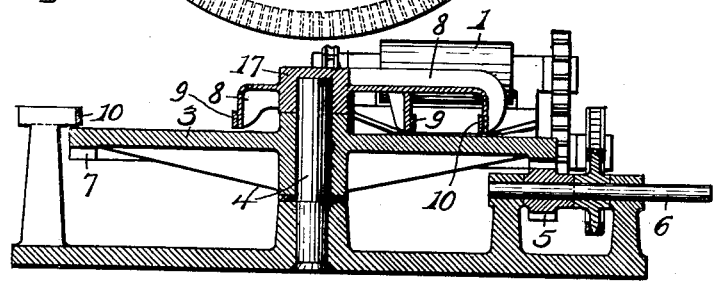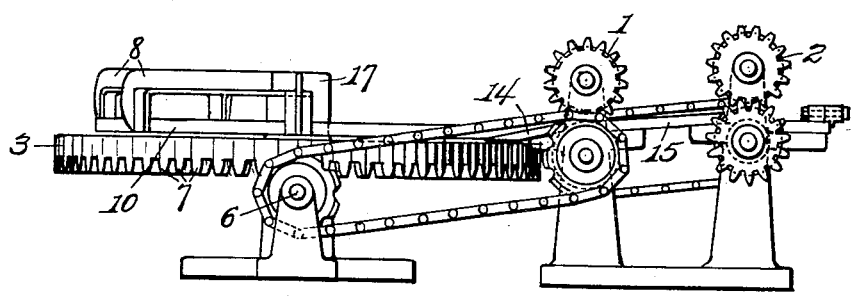

WILLIAM H. McSWAIN, OF MOUNDSVILLE, WEST VIRGINIA, AND HARRY W. McSWAIN, OF DETROIT, MICHIGAN.

GLASS-FEEDING TABLE.

1,230,424.  Specification of Letters Patent.  Patented June 19, 1917.

Application filed October 6, 1916. Serial No. 124,064.

*To all whom it may concern:*

Be it known that we, WILLIAM H. McSWAIN and HARRY W. McSWAIN, citizens of the United States of America, and residents, respectively, of Moundsville, county of Marshall, and State of West Virginia, and Detroit, county of Wayne, and State of Michigan, have invented certain new and useful Improvements in Glass-Feeding Tables, of which the following is a specification.

This invention relates broadly to glass feeding mechanism, and it has for its primary object to provide mechanism for automatically feeding glass in its molten state to sheet-forming rolls.

A further object is to provide automatic mechanism of the character mentioned whereby the glass is fed to the rolls in a continuous uniform stream.

And a still further object is to provide mechanism whereby prism glass may be formed by means of rolls as distinguished from the usual pressing methods heretofore employed.

With these and other objects in view, the invention resides in the features of construction, arrangement of parts and combinations of elements which will hereinafter be fully described, reference being had to the accompanying drawings, in which—

Figure 1 is a top plan view of the invention;

Fig. 2 is a vertical section on line 2—2, Fig. 1; and—

Fig. 3 is a side elevation.

Referring to said drawings, in which like designating characters distinguish like parts throughout the several views—

1 indicates a set of sheet-forming rolls, and 2 a set of rolls to which the sheet is directed from the rolls 1, the lowermost roll of the set 2 being preferably ribbed annularly for forming prisms in the under surface of the sheet which passes thereover.

Located adjacent to the rolls 1 on the front side thereof is a rotary table 3 associated with suitable mechanism whereby glass in its molten state may be fed to said rolls. Said table is rotatable upon an upright stationary shaft or spindle, as 4, and motion is communicated thereto in any suitable manner, as through the intermediacy of a pinion 5 fixed upon a drive-shaft 6, said pinion being in mesh with downwardly directed teeth 7 carried by said table adjacent to its peripheral edge, as shown.

Fixed upon the upper end of said shaft or spindle 4 is a hub-like sleeve or cap 17 having a plurality of radially disposed spider-like arms 8 which overhang said table and which constitute supports upon which are rigidly mounted two metal guides 9 and 10 between which molten glass deposited upon the table is directed to the rolls 1. Said guides are supported with their bottom edges closely approaching, or engaging, the surface of the table. The outer guide 10 is disposed adjacent to the edge of the table, the outer end portion thereof being arcuately curved and the opposite end portion thereof being straight and in direct alinement with the two sets of rolls 1 and 2. The guide 9 has its inner end portion straight and disposed parallel to the corresponding end portion of guide 10 whereby an intervening passageway of even width is provided over the table adjacent to the rolls 1. The outer end portion of said guide 9 is also arcuately curved, but may be disposed out of parallelism with the corresponding portion of guide 10 to form therebetween a curved tapering entrance throat portion leading to the straight passageway aforesaid. Leading from a glass melting tank or pot, as 11, is a pipe or conduit 12 through which molten glass from said pot gravitates, the discharge end of said conduit being located over the table 3 adjacent to the entrance throat of the passageway. As deposited on the table the molten glass spreads over the surface of the same between the guides and is carried forward between the latter by rotation of the table. Continued rotation of said table acts to cause the glass to be advanced through the passageway constituted by said guides and to be directed tangentially from the table to the rolls 1. There being an even and continuous flow of glass, controlled by a suitable valve or control-slide, as 13, provided in the conduit 12, the glass is fed to the rolls in a substantially uniform stream. A suitable plate 14 is interposed between the table and the set of rolls 1 whereon the glass travels in passing from the former to the latter. A second plate, as 15, is interposed between the rolls 1 and rolls 2 whereon the glass is carried from the former to the latter.

Suitable gearing is provided whereby the two sets of rolls are driven at a uniform speed which corresponds to that at which the column of glass is delivered thereto by the table 3.

It will be apparent that numerous changes within the scope of the appended claims may be made in the form and arrangement of some of the parts constituting the invention and without affecting the general construction and operation of the machine as a whole; hence, it is to be understood that I do not limit myself to the precise construction herein shown and described.

What is claimed is—

1. The combination with a set of rolls for forming sheet glass, of apparatus for feeding glass to said rolls, said apparatus comprising a horizontal table disposed adjacent to said rolls, means for rotating said table at a uniform speed, a pair of guides suspended over said table, said guides having their inner end portions disposed to form an intervening passageway upon the surface of and tangential with respect to said table, and means for supplying molten glass to said table in a continuous stream.

2. The combination with a set of rolls for forming sheet glass, of apparatus for feeding glass to said rolls, said apparatus comprising a horizontal table disposed adjacent to said rolls, means for rotating said table at a uniform speed, a pair of guides suspended over said table, said guides being arranged to form an intervening passageway upon the surface of the table, the inner end of said passageway being tangential with respect to the table and at a right angle to said rolls, and means for depositing molten glass in a continuous stream within the outer end of said passageway.

3. The combination with a set of rolls for forming sheet glass, of apparatus for feeding glass to said rolls, said apparatus comprising a horizontal table disposed adjacent to said rolls, means for rotating said table at a uniform speed, a pair of guides suspended over said table, said guides being arranged to form an intervening passageway upon the surface of the table, said passageway being curved and eccentric at its outer end, and being straight and tangential to said table at its inner end for guiding material directly to said rolls, and means for depositing molten glass in a continuous stream within the outer end of said passageway.

4. The combination with a set of rolls for forming sheet glass, of apparatus for feeding glass to said rolls, said apparatus comprising a horizontal table disposed adjacent to said rolls, means for rotating said table at a uniform speed, a pair of guides suspended in stationary positions over said table and close to the surface of the latter, said guides having their outer end portions arcuately curved and disposed to form a curved passageway adjacent to the edge of said table, and having their inner end portions straight and in parallelism to form a straight continuation of said passageway which leads off said table substantially at a tangent to the latter and in direct feeding alinement with said rolls, and means for depositing molten glass on said table adjacent to the outer end of said passageway.

5. The combination with a set of rolls for forming sheet glass, of apparatus for feeding glass to said rolls, said apparatus comprising an upright shaft located in front of and laterally with respect to said rolls, a table rotatable on said shaft, means for depositing molten glass on said table adjacent to the edge of the latter, a pair of guides supported over said table and forming therebetween a passageway for said glass over said table, the inner end of said passageway being straight and substantially tangential with respect to said table and leading directly from the latter to said rolls, and the outer end of said passageway being curved and adapted to receive therein the deposited glass as said table rotates.

In testimony whereof we affix our signatures in presence of two witnesses.

WILLIAM H. McSWAIN.
HARRY W. McSWAIN.

Witnesses:
VICTOR E. MYERS,
PAUL A. DECHAN.